(12) United States Patent
Magalhães de Matos

(10) Patent No.: US 11,516,632 B2
(45) Date of Patent: Nov. 29, 2022

(54) SYSTEMS AND METHODS FOR THE DYNAMIC MANAGEMENT AND CONTROL OF MULTIPLE WI-FI RADIOS IN A NETWORK OF MOVING THINGS INCLUDING, FOR EXAMPLE, AUTONOMOUS VEHICLES

(71) Applicant: Veniam, Inc., Mountain View, CA (US)

(72) Inventor: Ricardo Jorge Magalhães de Matos, Oporto (PT)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 16/829,262

(22) Filed: Mar. 25, 2020

(65) Prior Publication Data

US 2020/0314611 A1   Oct. 1, 2020

Related U.S. Application Data

(60) Provisional application No. 62/823,736, filed on Mar. 26, 2019.

(51) Int. Cl.
*H04J 3/00* (2006.01)
*H04W 4/40* (2018.01)
(Continued)

(52) U.S. Cl.
CPC ............ *H04W 4/40* (2018.02); *H04B 17/318* (2015.01); *H04L 67/10* (2013.01); *H04W 4/024* (2018.02);
(Continued)

(58) Field of Classification Search
CPC ..... H04W 48/18; H04W 84/12; H04W 88/06; H04W 4/40; H04W 28/0205; H04W 52/0264; H04W 16/14; H04W 24/02; H04W 24/08; H04W 36/32; H04W 4/024; H04W 4/027; H04W 4/029; H04W 52/245; H04W 52/40; H04W 84/042;
(Continued)

(56) References Cited

U.S. PATENT DOCUMENTS 10,440,096 B2 * 10/2019 Sabella ................. H04L 47/803
10,638,361 B2 *  4/2020 Gunasekara .......... H04W 48/16
(Continued)

FOREIGN PATENT DOCUMENTS

WO    2018195671 A1   11/2018
WO    2019006085 A1    1/2019

OTHER PUBLICATIONS

Int'l Search Report and Written Opinion Appln No. PCT/US2020/024689 dated Jun. 26, 2020 (15 pgs.).

*Primary Examiner* — Joseph Arevalo
(74) *Attorney, Agent, or Firm* — McAndrews, Held & Malloy, Ltd.

(57) ABSTRACT

A system for communication is provided, where the system comprises a context broker configured to gather context information for use in managing a plurality of radios, a Wi-Fi radio manager configured to manage the plurality of radio managers using the context information, and a plurality of radios, where each of the plurality of radio managers is configured to manage one of the plurality of radios for communication with another electronic device.

20 Claims, 16 Drawing Sheets

(51) Int. Cl.
*H04L 67/10* (2022.01)
*H04B 17/318* (2015.01)
*H04W 4/029* (2018.01)
*H04W 4/024* (2018.01)
*H04W 4/02* (2018.01)
*H04W 84/12* (2009.01)

(52) U.S. Cl.
CPC ........... *H04W 4/027* (2013.01); *H04W 4/029* (2018.02); *H04W 84/12* (2013.01)

(58) Field of Classification Search
CPC ..... H04W 16/04; H04W 16/18; H04W 28/04; H04W 28/048; H04W 28/06; H04W 28/18; H04W 36/00835; H04W 36/04; H04W 36/08; H04W 36/14; H04W 36/245; H04W 48/16; H04W 4/026; H04W 4/70; H04W 56/001; H04W 60/00; H04W 72/0453; H04W 72/082; H04W 76/15; H04W 80/10; H04W 84/18; H04W 88/085; H04W 8/08; H04W 8/245; H04M 7/006

USPC ....... 370/338, 329, 331, 311, 254, 310, 235, 370/337; 455/456.5, 557
See application file for complete search history.

(56) References Cited

U.S. PATENT DOCUMENTS

| | | | |
|---|---|---|---|
| 2010/0271802 | A1* | 10/2010 | Recker .................. H05B 45/12 362/20 |
| 2017/0086103 | A1 | 3/2017 | Neves et al. |
| 2017/0272317 | A1* | 9/2017 | Singla ................... H04W 12/06 |
| 2018/0220309 | A1 | 8/2018 | Gomes |
| 2019/0037418 | A1* | 1/2019 | Gunasekara ......... H04B 17/309 |
| 2019/0090174 | A1 | 3/2019 | Rocci et al. |
| 2019/0230500 | A1* | 7/2019 | Gonçalves ............ H04W 36/14 |
| 2020/0008044 | A1* | 1/2020 | Poornachandran ... H04W 16/18 |
| 2020/0076875 | A1* | 3/2020 | Sabella .................. G06F 9/505 |

* cited by examiner

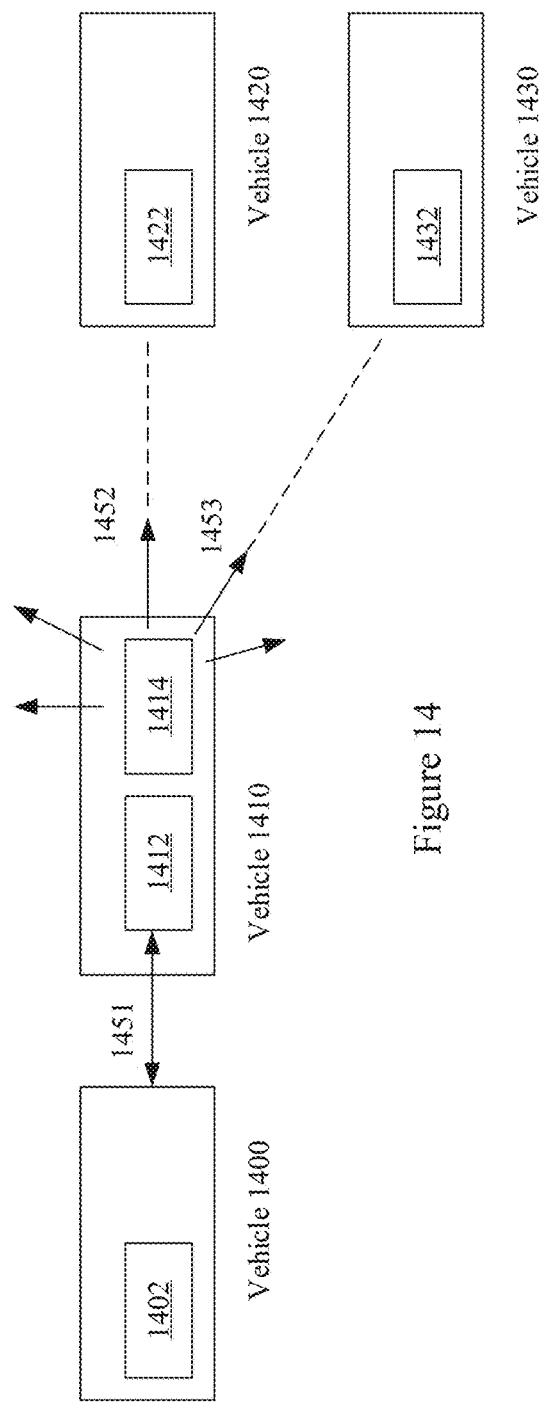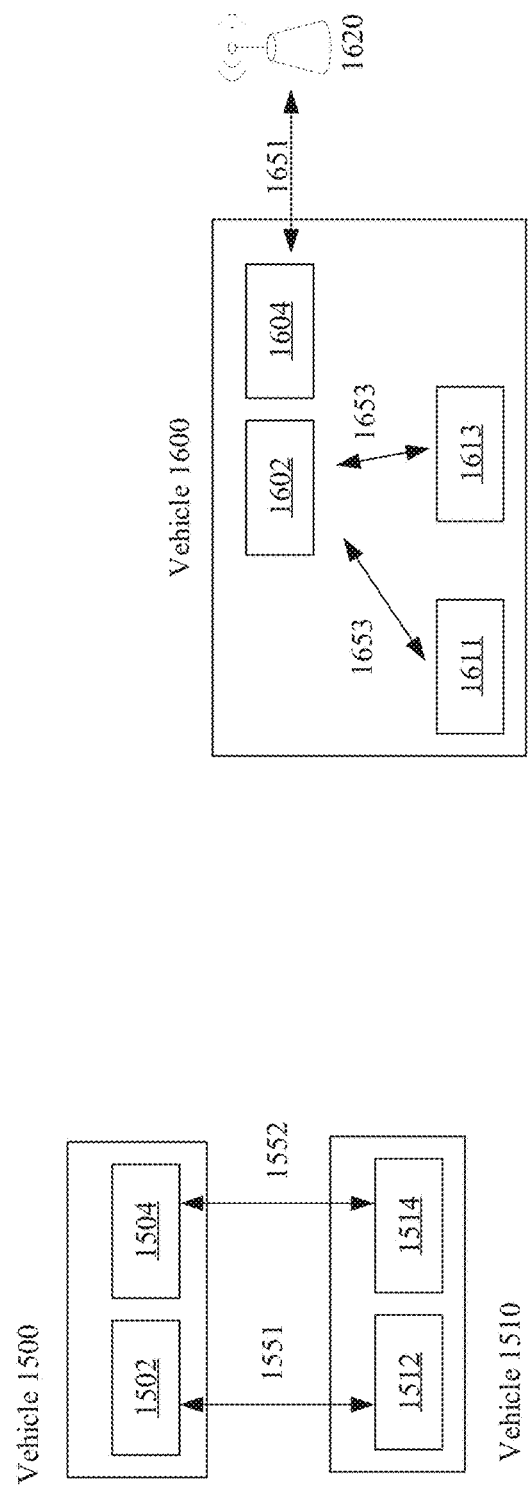

SYSTEMS AND METHODS FOR THE DYNAMIC MANAGEMENT AND CONTROL OF MULTIPLE WI-FI RADIOS IN A NETWORK OF MOVING THINGS INCLUDING, FOR EXAMPLE, AUTONOMOUS VEHICLES

CROSS-REFERENCE TO RELATED APPLICATIONS/INCORPORATION BY REFERENCE

The present application claims priority to and claims benefit from U.S. Provisional Patent Application Ser. No. 62/823,736 titled "SYSTEMS AND METHODS FOR THE DYNAMIC MANAGEMENT AND CONTROL OF MULTIPLE WI-FI RADIOS IN A NETWORK OF MOVING THINGS INCLUDING, FOR EXAMPLE, AUTONOMOUS VEHICLES" that was filed on Mar. 26, 2019. The above application is hereby incorporated herein by reference in its entirety.

This patent application is related to U.S. patent application Ser. No. 15/644,377, titled "Systems and Methods for Calculating the User QoE Based on WiFi Sessions Over Multiple Networks in a Network of Moving Things," filed on Jul. 7, 2017, which claims priority to, and claims benefit from U.S. Provisional Application Ser. No. 62/417,734, filed on Nov. 4, 2016, and titled "Systems and Methods for Calculating the User QoE Based on WiFi Sessions Over Multiple Networks in a Network of Moving Things," which are hereby incorporated herein by reference in their entirety.

This patent application is related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299, 269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving static and mobile nodes, including, for example, autonomous vehicle. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 14 shows an example communication between two vehicles while one of the two vehicles is also scanning for other communication devices, in accordance with various aspects of the present disclosure.

FIG. 15 shows an example communication between two vehicles, where there are multiple mobile access points in the first vehicle communicating with multiple mobile access points in the second vehicle, in accordance with various aspects of the present disclosure.

FIG. 16 shows an example communication between a first mobile access point in a vehicle and a fixed access point, and between a second mobile access point in the vehicle and multiple end users, in accordance with various aspects of the present disclosure.

SUMMARY

Figure 1:
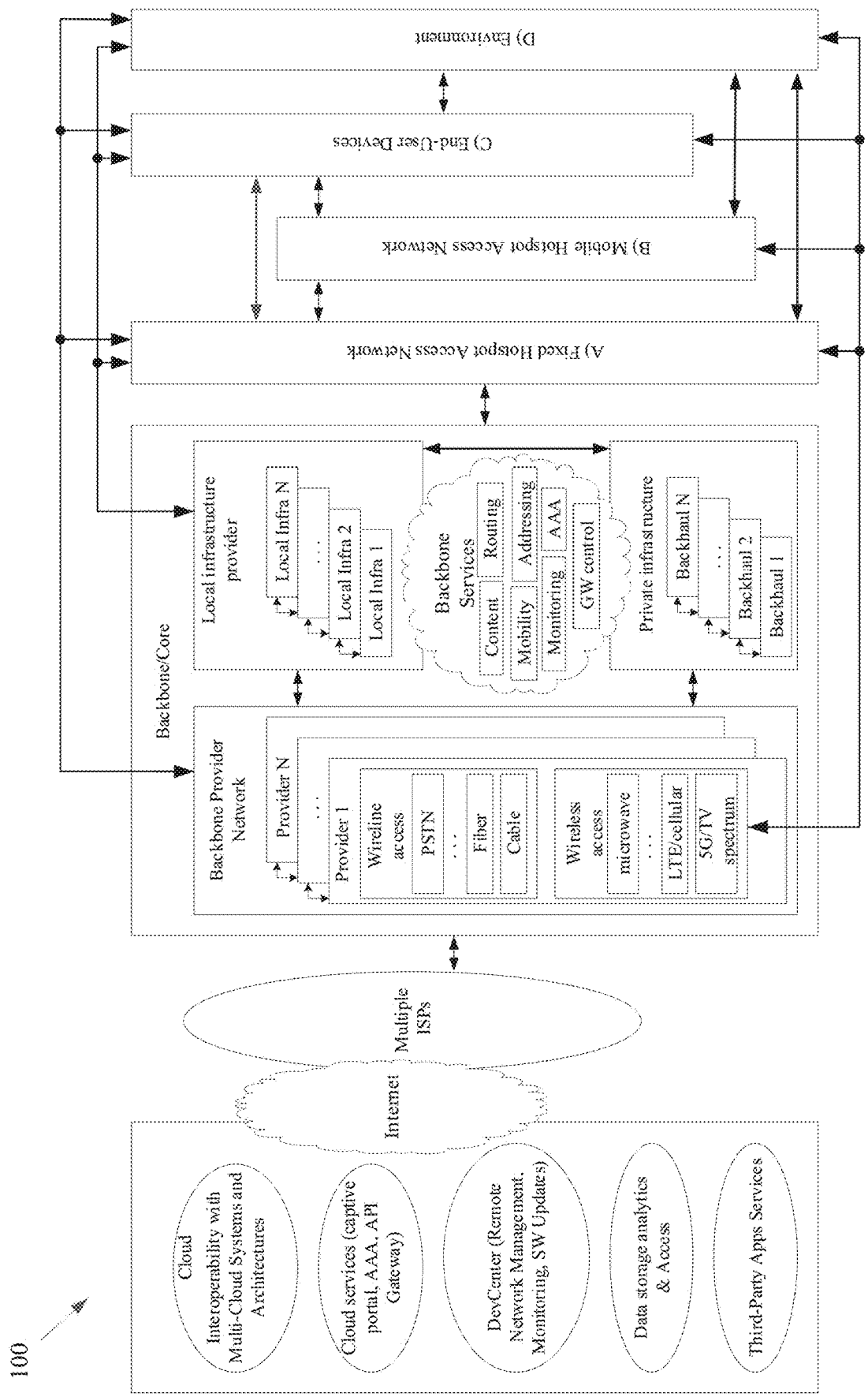
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or." As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components of FIGS. 2-6, 8 and 10-18, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
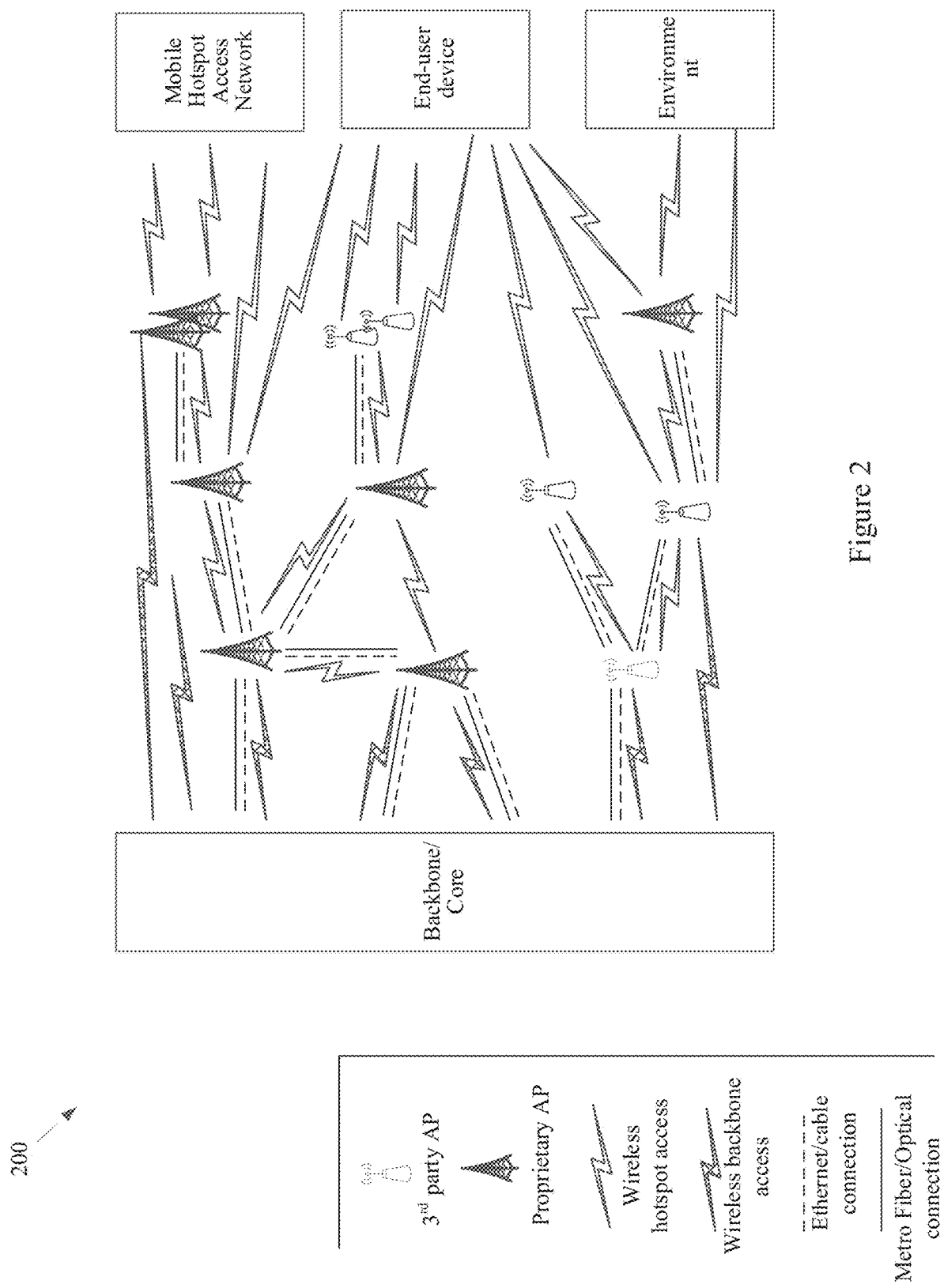
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components shown in FIGS. 1, 3-6, 8 and 10-18, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
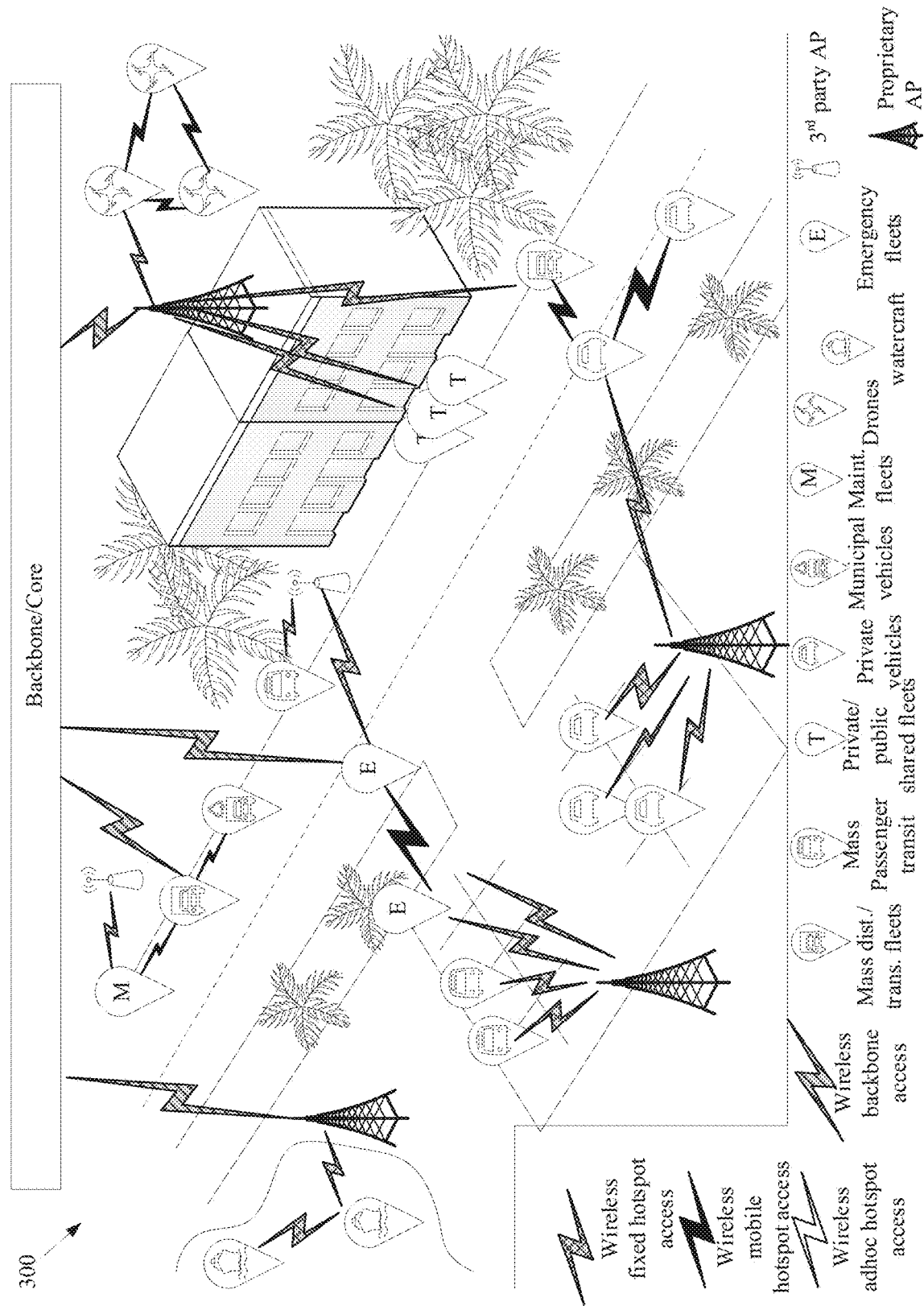
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components shown in FIGS. 1-2, 4-6, 8 and 10-18, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may be (at least at times) be such a wired link, at least temporarily.

Figure 4:
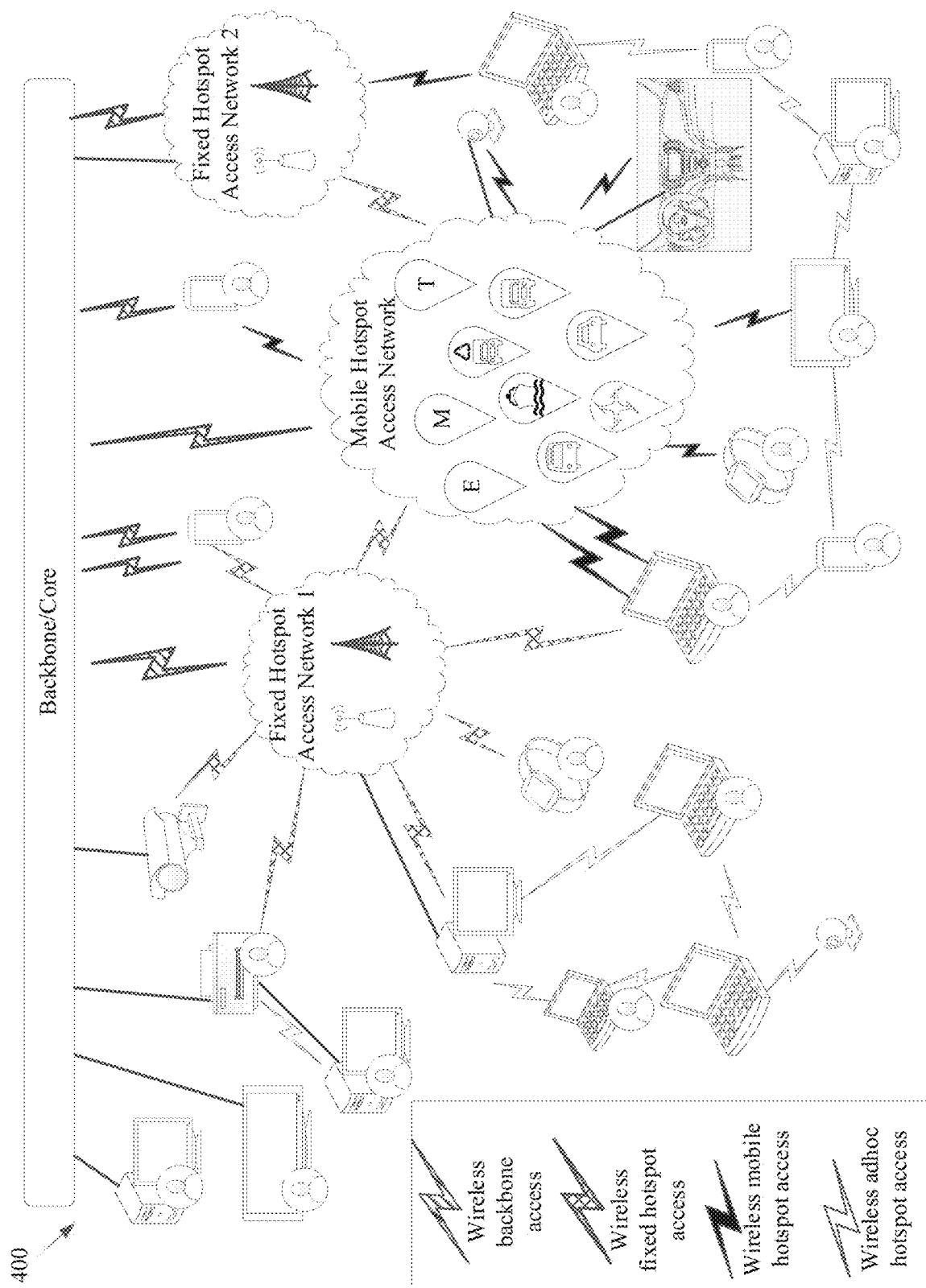
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components shown in FIGS. 1-3, 5-6, 8 and 10-18, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
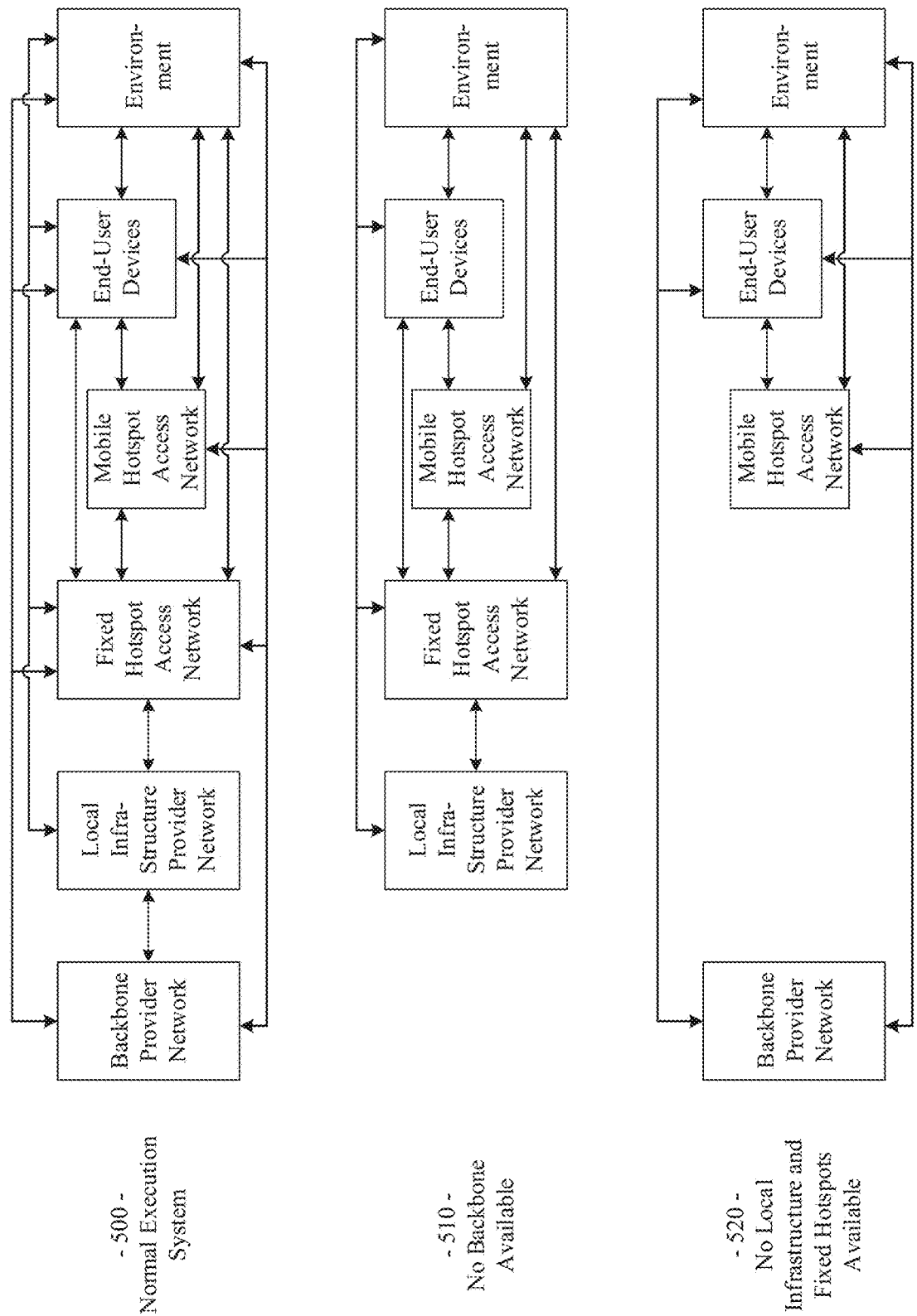
FIGS. 5A-5C show a plurality of network configurations illustrating the flexibility and/or and resiliency of a communication network, in accordance with various aspects of this disclosure.
Figure 5B:
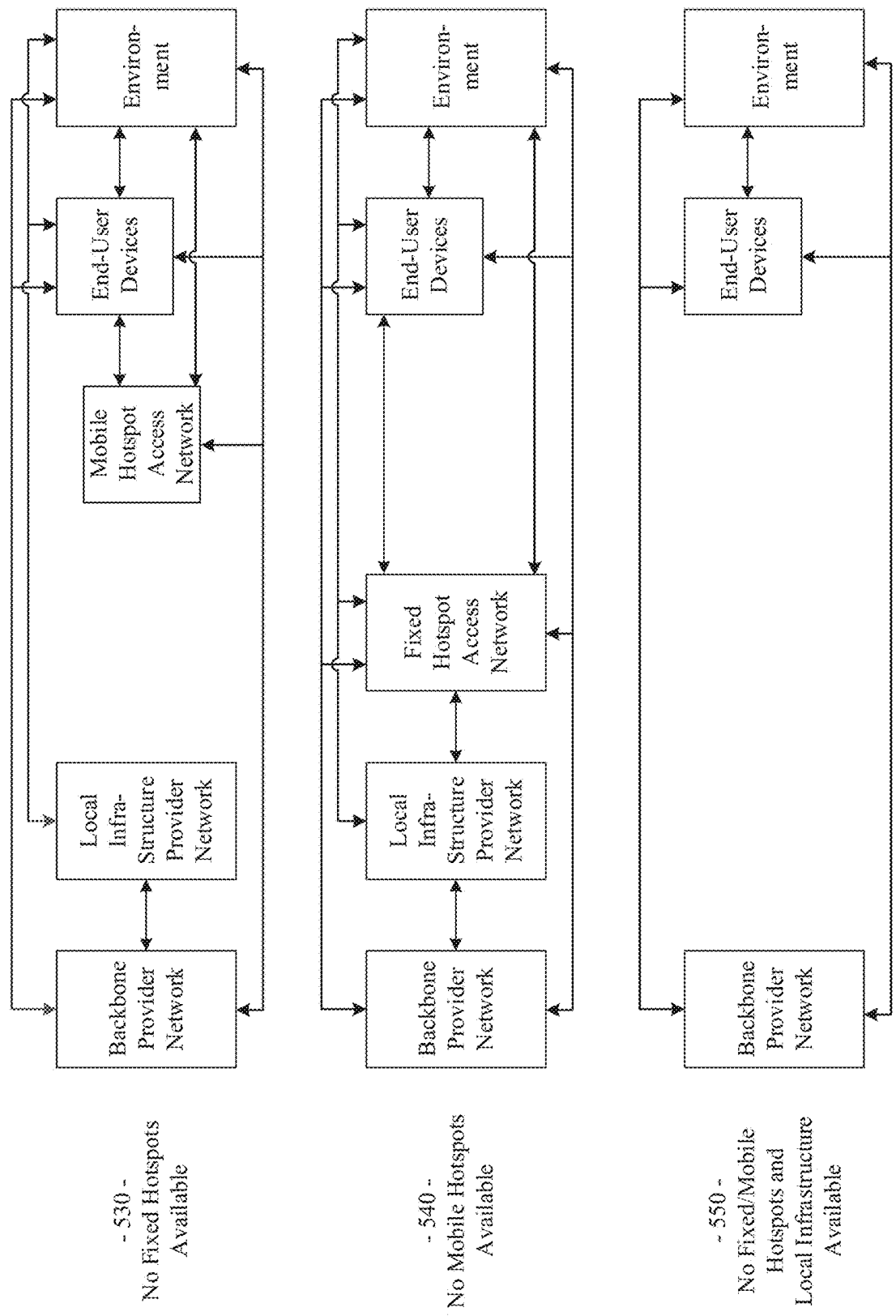
Figure 5C:
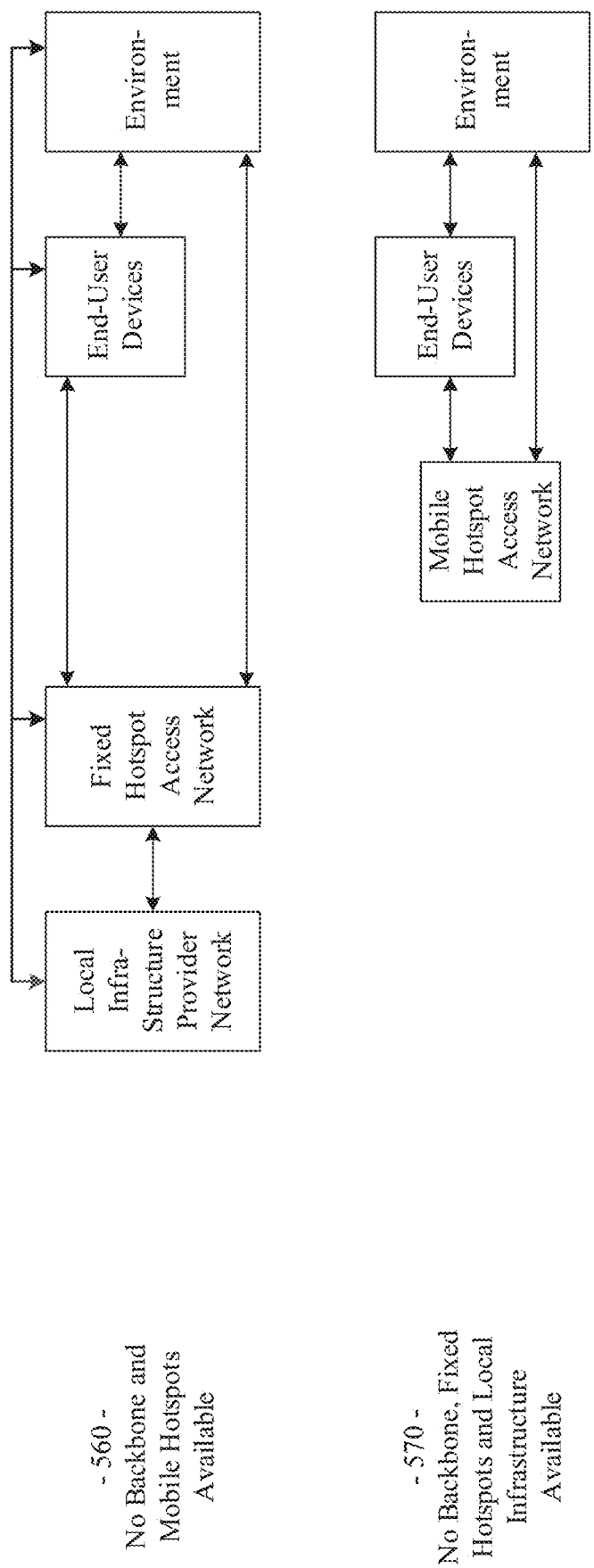

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components shown in FIGS. 1-4, 6, 8 and 10-18, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
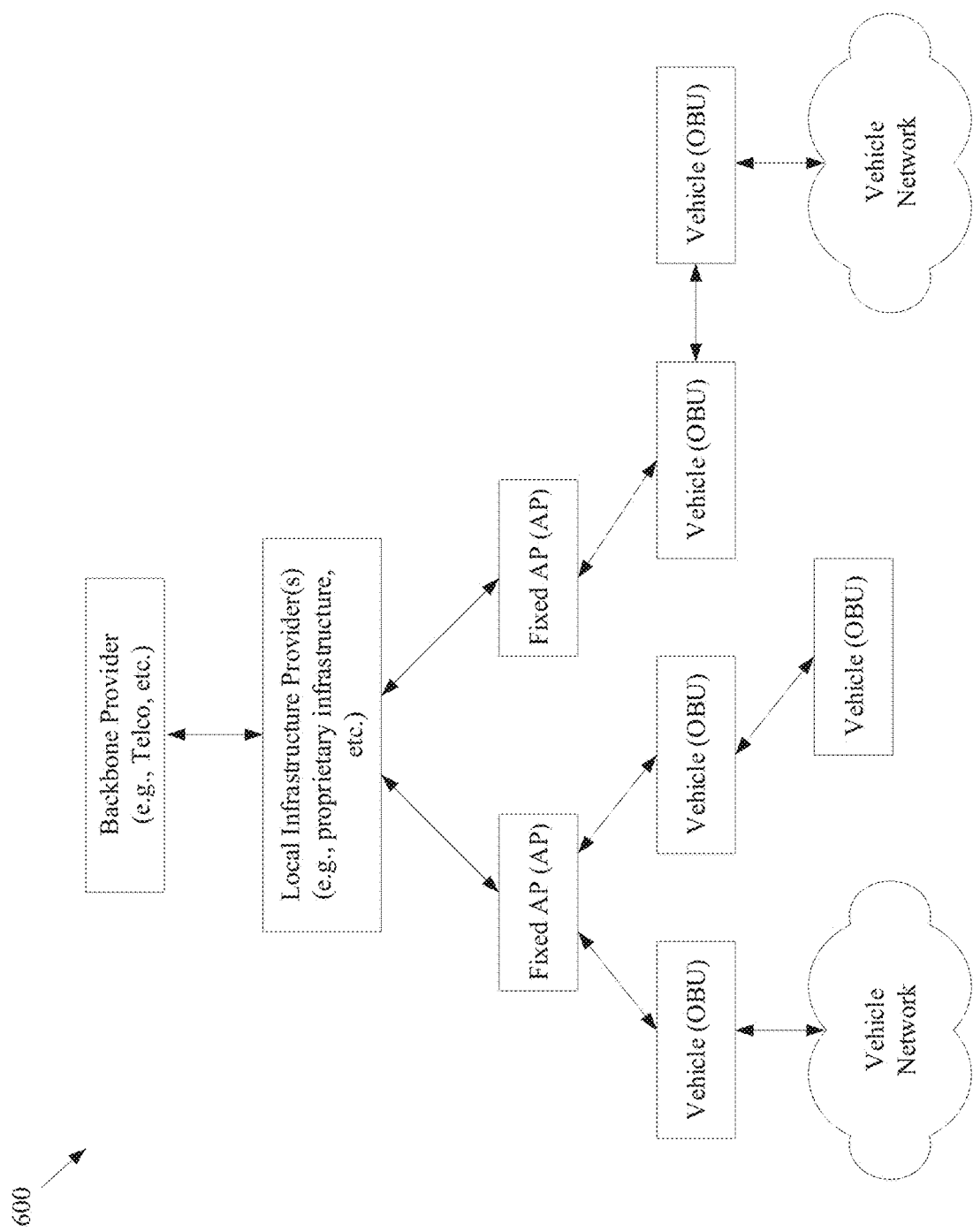
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components shown in FIGS. 1-5, 8 and 10-18, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In recent years, vehicles have become more and more connected (including via Wi-Fi, cellular or V2X connectivity), and, hence, an increasingly large amount of data are constantly being transferred between vehicles, and between the vehicles and the Cloud. The data is flowing in both upload and download directions, and is being utilized for different types of services and applications consumed by the vehicle that can be running locally in the vehicle or remotely in the Cloud (offload data from sensors, navigation systems, software updates from telematic and communication units, car operating systems and vehicle ECUs, etc.). However, while Wi-Fi infrastructure is growing and underutilized at street level, cellular infrastructure may generally be at a maximum or near maximum capacity.

In this challenging environment, vehicles and applications/services inside the vehicles are fighting for the scarce cellular network capacity. Accordingly, efficient control and management of the large amounts of data required by the vehicles is helpful considering the importance of the data for the internal or external applications that consume such data. Various embodiments of the disclosure may provide the efficient control and management for the available networks and for the vehicles that are able to access at least one of the networks, including other vehicles, at each point in time, within a context of each vehicle, etc.

It should be understood that the term "vehicle" includes "autonomous vehicles" and "driver assisted vehicles," as well as any other type of vehicles. For example, a vehicle may be, as examples, and without limitation, a node for use on land and/or under land, watercraft for use on water and/or under water (e.g., boats, ships, speedboats, tugboats, barges, submarines, etc.), aircraft/spacecraft for use in air and/or space (e.g., drones, airplanes, satellites, etc.). The applications within a vehicle may be applicable to the operation of the vehicle, or may be applications used by a passenger in the vehicle. For example, if the vehicle is an autonomously operating bus, in addition to the vast amounts of data needed for the operation of the bus, there may be numerous passengers in the bus that are receiving data (streaming movies, songs, etc.) or transmitting data (uploading videos/pictures, chats, etc.).

Accordingly, various embodiments of the disclosure describe using Wi-Fi networking as an opportunity to make vehicle data transfer more efficient for ease of description, and it should be understood that any other type(s) of networks available may also be used for intelligent data transfer to allow data to be communicated more efficiently. A radio may comprise transceiver circuitry and appropriate hardware and/or software for controlling transmission/reception of radio waves, and may include processors for processing received and/or demodulated signals, as well as processing signals to be transmitted.

More specifically, when one or more Wi-Fi radio(s) is available in the vehicle, various embodiments of the disclosure may take into account such things as, for example: dynamic selection and adaptation of the number of Wi-Fi radios that should be turned-on; the number of Wi-Fi radios that should be configured; a configuration assigned to each Wi-Fi radio; the mode each radio should be operating; download and upload applications that should be leveraged for each Wi-Fi radio, mode and configuration; internal and external applications that should leverage to each Wi-Fi radio, mode and configuration; applications that should be prioritized in each specific Wi-Fi configuration; etc.

The radio configuration may indicate, for example, whether the radio is vehicle-to-infrastructure (V2I), vehicle-to-vehicle-to infrastructure (V2V2I), vehicle-to-vehicle (V2V), or access point (AP). It may be seen that there are other radio configurations, including those that may be a combination of these configurations.

The mode that each radio may operate in may be, for example, whether the radio is connecting or connected to another node or scanning for another node. A node is an AP (FAP, MAP) or an electronic device that is able to connect to a network.

Additionally, the Wi-Fi configurations may be dependent on variables such as, for example: the hardware and radios available in a vehicle; the applications that require Wi-Fi access; the environment context of the vehicle, such as, for example, the number of APs within communication distance of the vehicle, nearby vehicles and users; the amount of data to be transferred; the speed, direction and location of the vehicle; and policies from the customer; etc.

The customer policy may indicate, for example, the amount of data that the customer is allocated for transfer, the amount the customer is willing to pay for transmission/reception of data, the importance of data transfer (real-time or delayed), etc.

Accordingly, various embodiments of the disclosure may optimize operation to: reduce the overall cost consumption per distance, time and vehicle/fleet; increase the data off-loaded as needed for faster and/or cheaper transfer; and increase the overall quality experienced per application, service, or user.

Each Wi-Fi configuration may be configured locally at the vehicle or remotely in the Cloud, taking into account real-time or historical decision factors and parameters.

Figure 7:
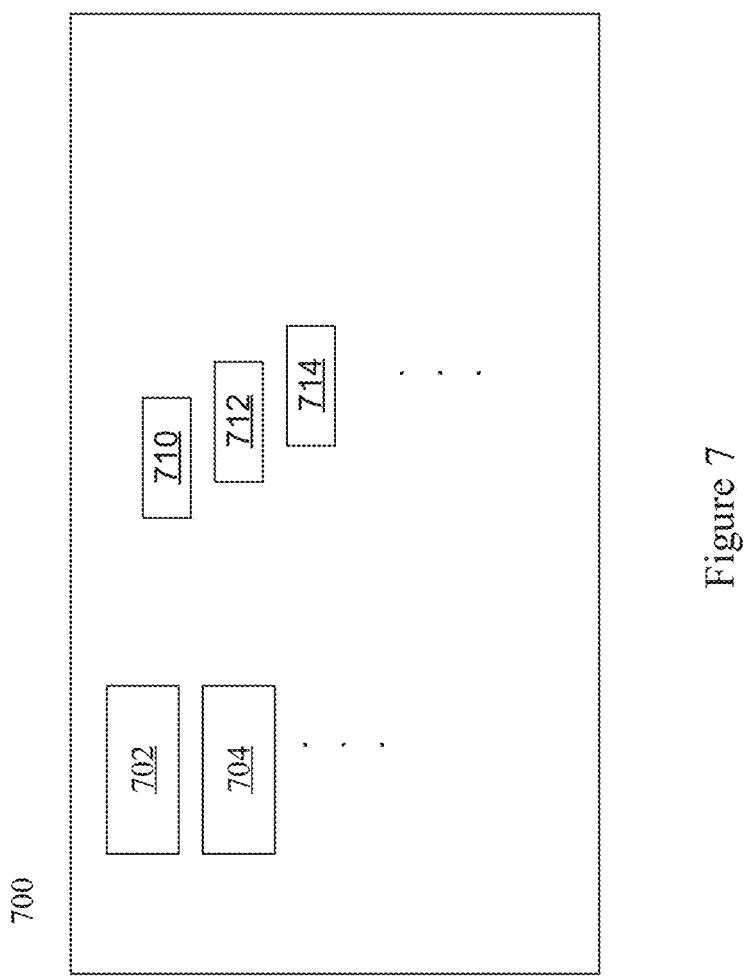
FIG. 7 shows a block diagram of example communication devices in a vehicle, in accordance with various aspects of the present disclosure.

FIG. 7 shows a block diagram of example communication devices in a vehicle, in accordance with various aspects of the present disclosure. Referring to FIG. 7, there is shown a vehicle 700 with communication devices 702 and 704, which may be, for example, Wi-Fi radios associated with the vehicle 700. Various embodiments may have different number of Wi-Fi radios. For example, a vehicle may have one Wi-Fi radio or more than the two example Wi-Fi radios shown in FIG. 7.

The vehicle 700 may also have, for example, communication devices 710 . . . 714 that may belong to passengers. The communication devices 710 . . . 714 may be able to connect to an external network, such as, for example, the Internet, via one or more of the communication devices 702 . . . 704.

Figure 8:
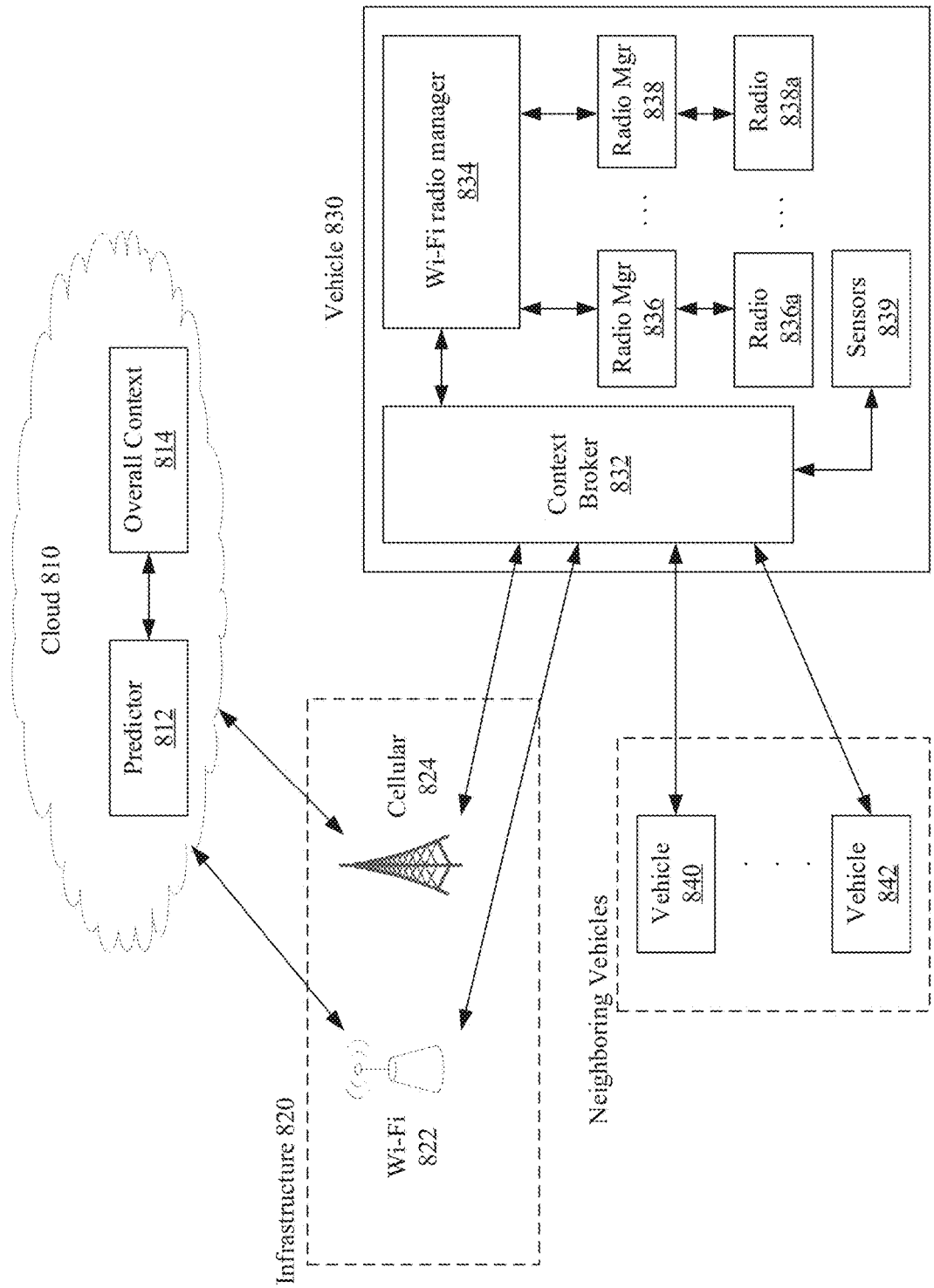
FIG. 8 shows a block diagram of an example communication network, in accordance with various aspects of the present disclosure.

FIG. 8 shows a block diagram of an example communication network, in accordance with various aspects of the present disclosure. Any or all of the functionality discussed herein may be performed by any or all of the example components of the example network of FIG. 8. Also, the example network in FIG. 8 may, for example, share any or all characteristics with the other example methods, systems, networks and/or network components of FIGS. 1-6 and 10-18, discussed herein.

Referring to FIG. 8, there is shown Cloud 810, communication infrastructure 820 comprising a Wi-Fi access point (AP) 822 and a cellular tower 824, vehicle 830, and neighboring vehicles 840 . . . 842. While only the Wi-Fi AP 822 and the cellular tower 824 are shown for the infrastructure 820 for the sake of simplicity, it should be understood that the infrastructure 820 may also comprise many other objects such as, for example, traffic lights, sensors for keeping tabs on moving traffic, databases that handle information about traffic, condition of roads, etc.

As shown in FIG. 8, the vehicle 830 may comprise a context broker 832, a Wi-Fi radio manager 834, radio managers 836 . . . 838, radios 836a . . . 838a, and sensors 839. The context broker 832 in the vehicle 830 may be responsible for gathering the context that may influence a decision. This context may include various needs and/or requirements of applications and/or services, information characterizing the moving thing (such as, location, speed, direction of travel, processing capabilities, resources, etc.), and also information from the infrastructure (available APs, routes, vehicles nearby, etc.).

The Wi-Fi radio manager 834 may be responsible for matching all the context requirements and needs with the available radios 836a . . . 838a, and map the data flows and/or traffic flows to those radios 836a . . . 838a. Accordingly, the Wi-Fi radio manager 834 may decide if a radio should be turned on or turned off, and, if turned on, how that Wi-Fi radio may be configured.

The radio managers 836 . . . 838 may acquire and configure all the relevant information for the radios (signal power, RSSI, interference, channels, frequencies, etc.) that they correspond to. For example, the radio manager 836 may configure the radio 836a, and the radio manager 838 may configure the radio 838a. That is, the radio manager 836 may receive radio configuration information from the Wi-Fi radio manager 834, and configure the radio 838a in accordance with the radio configuration information.

The neighboring vehicles 840 . . . 842 may generally be similar to the vehicle 830, and provide information from previous connections to, for example, the Wi-Fi APs such as the Wi-Fi AP 822, data they are willing to share or data they need from others, and all the context they found relevant to share with their neighbors.

The infrastructure 820 may comprise Wi-Fi APs, traffic lights, and all other IoT-based nodes, and the various nodes may frequently announce themselves in the network and/or provide backhaul for connectivity.

The Cloud 810 may be the endpoint for in-vehicle applications and services. That is, it may be through the Cloud where typically applications/services provide their requirements and needs, entities managing/controlling the vehicles have the full context and the global overview of all the vehicle actions, and where a database may exists with all the historical information/context characterizing all vehicles that communicate with the Cloud 810.

The predictor block 812 may exist in the Cloud 810 and may be able to correlate the real-time context received from the physical world against the models/patterns (not shown) that may exist in the Cloud 810, where the model/patterns may be built based on the information received and stored in the Cloud 810, where the information may be supplemented and/or updated by new information. This model in the Cloud 810 may be used to infer new actions and/or decisions to be made by the vehicles 830 and 840 . . . 842, and notify the context broker 832 in, for example, each vehicle of the new actions and/or decisions.

The overall context block 814 block may be configured to store the full context and the global overview of all the vehicle actions and context, and may tag data as real time or historical.

Accordingly, the vehicle 830 may be configured to communicate with the Cloud 810 via at least a part of the infrastructure 820, and the vehicle 830 may receive information from the infrastructure 820. The information may be, for example, from sensors associated with the infrastructure 820 and/or information received from other vehicles that may be, or have communicated, with the infrastructure 820, such as, for example, available APs, routes, vehicles nearby, etc. The vehicle 830 also communicates with other vehicles 840 . . . 842. Similarly, the vehicle 830 may receive information from the other vehicles 840 . . . 842 and transmit information to the other vehicles 840 . . . 842. The vehicle 830 may also receive information from its sensors 839.

Information communicated among the nodes may be, for example, environmental information such as the traffic conditions, road conditions, sensor information (e.g., pictures and/or videos of surrounding areas, information about other available nodes, etc.), weather information, etc. The information may also concern, for example, amount of data received or transmitted in the recent past (e.g., past second, past 10 seconds, etc.), the types of data transferred (e.g., real-time or delayed), nodes connected to, networks used (e.g., cellular, Wi-Fi, etc.), etc. The information may also relate to the applications being run or that have run in the various nodes. The various types of information may allow a node such as, for example, the vehicle 830, to make intelligent decisions when configuring the Wi-Fi radios 836a . . . 838a.

Accordingly, the vehicle 830 may be able to dynamically configure and operate the Wi-Fi radios 836a . . . 838a that are available for multiple scenarios possible (V2I, V2V, V2I2V, etc.) based on the needs of different applications or trying to maximize different system goals. For that purpose, there are several methods and mechanisms that may be in place to provide the context required for that control and management. The decisions may be tailored to the context in question, and that context should be provided either by context sources available in the vehicle, in its local neighborhood, or in the Cloud. The context may be real-time or based on historical information, and the context may affect decisions that should be taken now, or decisions that will happen in the future, whether several seconds, minutes, and/or hours.

Figure 9:
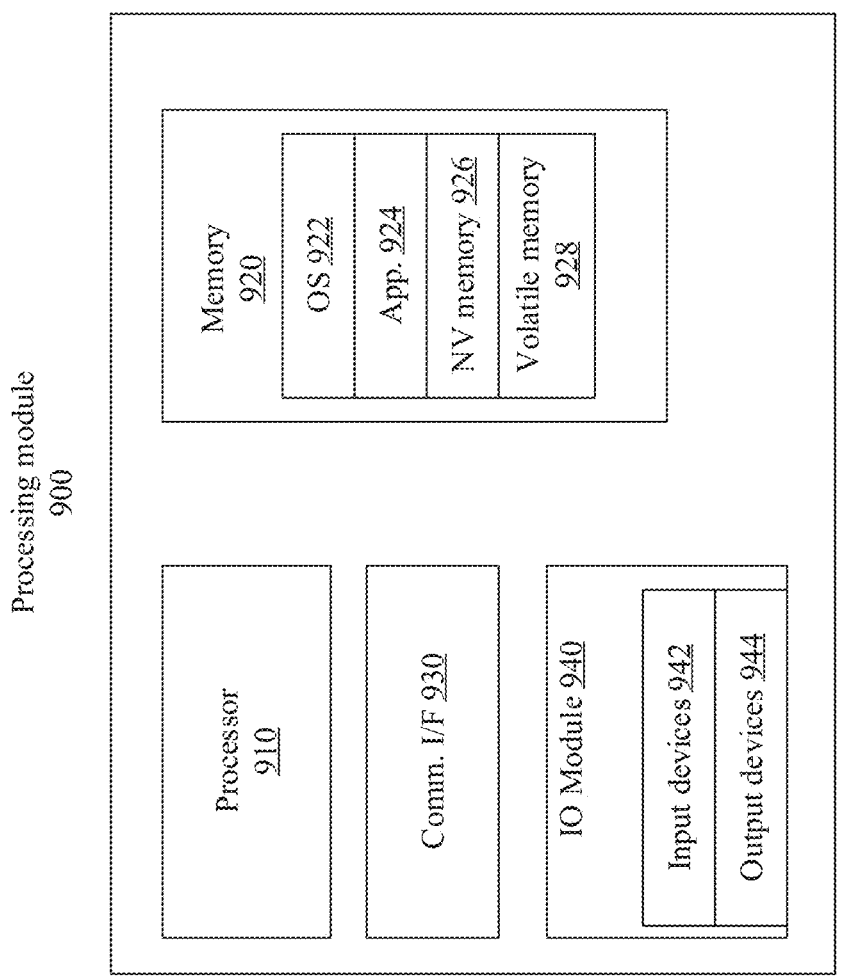
FIG. 9 shows an example block diagram for a processing circuitry, in accordance with various aspects of the present disclosure.

FIG. 9 shows an example block diagram for a processing circuitry, in accordance with various aspects of the present disclosure. Referring to FIG. 9, there is shown a processing module 900 that may be present in a vehicle such as, for example, the vehicle 830. All or portions of the processing module 900 may be a part of a vehicle such as, for example, the vehicle 830, or may be installed after the vehicle was manufactured. The processing module 900 may comprise, for example, a processor 910, memory 920, a communication interface 930, and an IO interface 940. The processing module 900 may also be used, at least in part, in the Cloud 810 and/or the infrastructure 820. As can be seen, the processing module 900 may also be used, for example, for specific parts of the various nodes. For example, the processing module 900 may be used in the predictor 812, the overall context module 814, the Wi-Fi AP 822, the cellular tower 824, the context broker 832, the Wi-Fi radio manager 834, the radio managers 836 . . . 838, and the radios 836a . . . 838a.

The processor 910 may be a dedicated processor for processing driving related data or the processor 910 may operate in concert with one or more processors that may, for example, control the vehicle 830 and/or assist in the operation of the vehicle 830, or operate in concert with other processor(s) in a node. The memory 920 may include non-volatile memory 926 and volatile memory 928. The operating system 922 and applications 924 may be stored in, for example, the non-volatile memory 926, and may be copied to volatile memory 928 for execution. For example, each of the predictor 812, the context broker 832, the Wi-Fi radio manager 834, the radio managers 836 . . . 838, and the radios 836a . . . 838a may run code that is in its corresponding non-volatile memory 926. Various embodiments of the disclosure may use different memory architectures that are design and/or implementation dependent.

The communication interface 930 may allow the processing module 900 to communicate with other devices via, for example, a wired protocol such as USB, Ethernet, Firewire, etc., or a wireless protocol such as Bluetooth, Near Field Communication (NFC), Wi-Fi, etc. The communication may be, for example, with other nodes such as in the infrastructure 820 and vehicles 830, and including various sensors and/or devices that can relay sensor data. The communication may also be with, for example, with one or more system/Cloud servers such as the Cloud 810.

The processing module 900 may also comprise, as needed, the IO module 940 for communication with a user via the input devices 942 and output information to be displayed on output devices 944. The input devices 942 may comprise, for example, buttons, touch sensitive screen, which may be a part of a display, a microphone, etc. In some embodiments, one or more of the sensors 839 may also be considered to be a part of the input devices 942. The output devices 944 may comprise, for example, the display, a speaker, LEDs, etc.

The processor 910 may operate using different architectures in different embodiments. For example, the processor 910 may use the memory 920 to store instructions to execute, or the processor 910 may have its own memory (not shown) for its instructions. Furthermore, various embodiments may have the processor 910 work in concert with other processors in the vehicle 830, the Wi-Fi AP 822, the Cloud 810, and/or processors that may belong to an electronic device of, for example, the driver and/or passenger(s) of the vehicle 830. Various embodiments may also allow any of the processors to work individually.

Various embodiments may use other architectures where the different functionalities may be grouped differently. For example, the grouping may be in different integrated circuit chips. Or the grouping may combine together different devices such as the IO module 940 and the communication interface 930, etc.

There are shown below various example modes for communication among a plurality of nodes. In order to configure each of the modes below, a vehicle may gather or have access to specific context from the Cloud, other vehicles, access points, etc.

Figure 10:
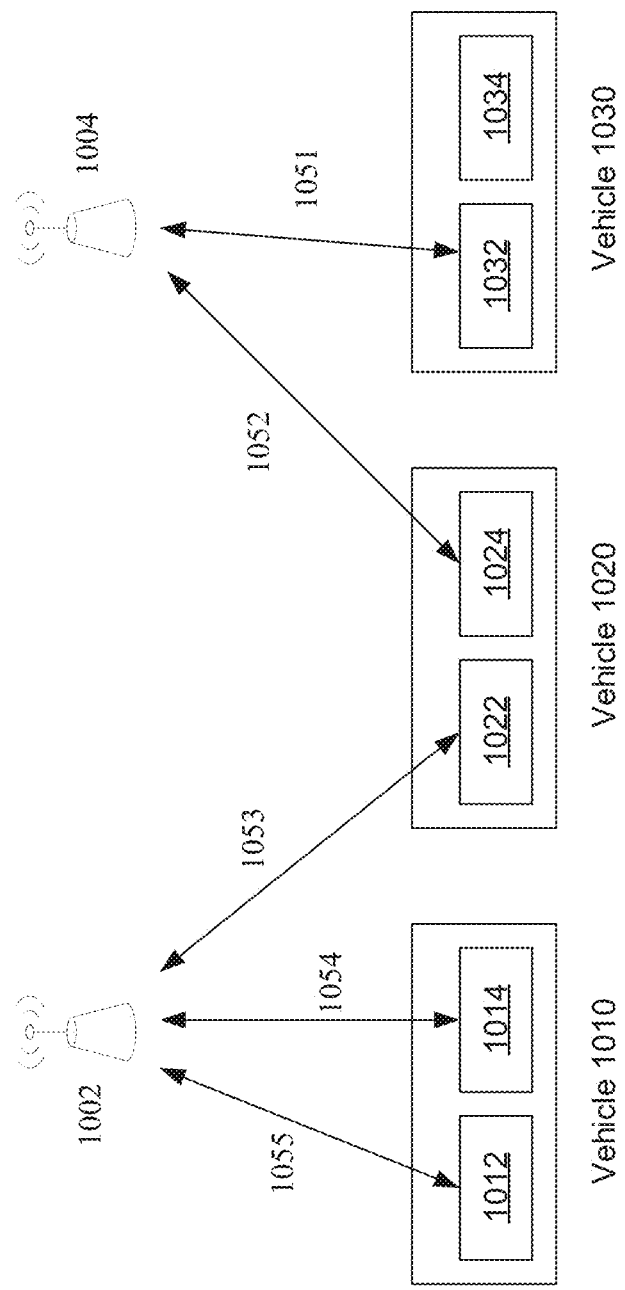
FIG. 10 shows an example of communication between a vehicle and a fixed access point, in accordance with various aspects of the present disclosure.

FIG. 10 shows an example of communication between a vehicle and a fixed access point, in accordance with various aspects of the present disclosure. Any or all of the functionality discussed herein may be performed by any or all of the example components of the example network of FIG. 10. Also, the example network in FIG. 10 may, for example, share any or all characteristics with the other example methods, systems, networks and/or network components of FIGS. 1-6, 8, and 11-18, discussed herein.

Referring to FIG. 10, there are shown example scenarios 1, 2, and 3 of single V2I Wi-Fi, Multiple V2I through the same Wi-Fi AP, and Multiple V2I through different Wi-Fi APs, respectively.

In scenario 1, the example of single V2I Wi-Fi, a vehicle 1030 uses the Wi-Fi radio 1032 to connect via a wireless connection 1051 to a single SSID broadcasted by a fixed Wi-Fi AP 1004. The vehicle 1030 uses its Wi-Fi radio module to upload traffic through low-cost technologies by connecting to public and/or private Wi-Fi access points. The traffic may be real-time and/or delay-tolerant.

The vehicle 1030 may receive context information from nearby APs such as the AP 1004, or notifications from the Cloud, such as the Cloud 810, indicating that various APs are available nearby for connection. Context information can include, for example, the specific protocol version (11ac, 11n, etc.), frequencies (2.4 or 5 Ghz) and channels broadcast by APs, or the available bandwidth provided by the infrastructure connecting those APs. Accordingly, the vehicle 1030 may increase the data offloaded and reduce the costs or time of sending data over expensive or slow technologies, such as various cellular technologies.

FIG. 10 also shows scenario 2 with an example of multiple V2I through the same Wi-Fi AP where the Wi-Fi radios 1012 and 1014 of the vehicle 1010 are used to communicate with the Wi-Fi AP 1002 via wireless connections 1055 and 1054, respectively. The vehicle 1010 is able to connect to different SSIDs broadcast by the same Wi-Fi AP 1002 in different frequencies and/or channels. Accordingly, if there is not a bottleneck in the backhaul infrastructure, the vehicle 1010 may be able to get more bandwidth as there is generally no interference between the wireless connections 1055 and 1054 that are using different frequencies or channels.

The context information for the scenario 2 may be similar to the context information for scenario 1, but the vehicle 1010 may also be notified of how many Wi-Fi radios are available in the Wi-Fi AP 1002.

The vehicle 1010 may be able to connect to different channels or frequencies provided by the same Wi-Fi AP 1002, which allows more flexibility and isolation, and also adds the possibility of increasing the bandwidth available to communicate with the Cloud 810.

FIG. 10 additionally shows scenario 3 with an example of multiple V2I through different Wi-Fi APs 1002 and 1004. For example, the vehicle 1020 may connect to two different SSIDs broadcast by different fixed Wi-Fi APs 1002 and 1004 using two different Wi-Fi radios 1022 and 1024 using wireless connections 1053 and 1052, respectively.

This is a similar scenario as in scenario 2, but now the vehicle 1020 is able to connect to different SSIDs broadcast by different Wi-Fi APs 1002 and 1004. Accordingly, the vehicle 830 may be connected to different Wi-Fi providers with different capabilities. The context information in this scenario may be similar as in scenarios 1 and 2. This scenario may also provide flexibility to enable the same vehicle 1020 to communicate with fully isolated networks owned by different infrastructure providers.

Figure 11:
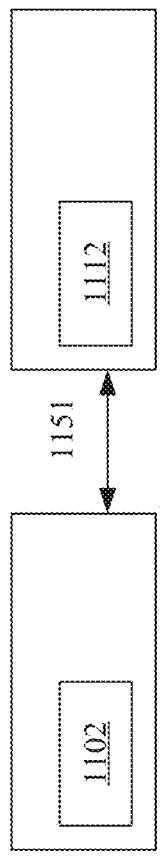
FIG. 11 shows an example of communication between two vehicles, in accordance with various aspects of the present disclosure.

FIG. 11 shows an example of communication between two vehicles, in accordance with various aspects of the present disclosure. Any or all of the functionality discussed herein may be performed by any or all of the example components of the example network of FIG. 11. Also, the example network in FIG. 11 may, for example, share any or all characteristics with the other example methods, systems, networks and/or network components of FIGS. 1-6, 8, 10, and 12-18, discussed herein.

Referring to FIG. 11, there is shown scenario 4 with an example of single V2V Wi-Fi connection 1151 between the vehicle 1100 and 1110. In this case, there is no Wi-Fi AP in the neighborhood, and the vehicle 1100 may make use of its Wi-Fi radio 1102 to connect to another vehicle 1110 with its Wi-Fi radio 1112. Accordingly, various vehicles may be able to share content and data when they are near each other. For example, the vehicle 1100 may have downloaded various information, such as, for example, software updates, location data, map updates, look-ahead context, etc., from the Cloud 810 while the vehicle 1110 was not able to connect to the Cloud 830. Look-ahead context may allow a vehicle to plan accordingly based on information not available to it directly or from the Cloud 830. For example, the vehicle 1100 may be moving in a direction that the vehicle 1110 came from. When they near each other, the vehicle 1110 may provide information, such as, for example, that there is an accident ahead with resulting traffic jam. Accordingly, this information may allow the vehicle 1100 to change its route to avoid the traffic jam. Accordingly, when the vehicle 1110 connects via Wi-Fi with the vehicle 1100, the vehicle 1110 may be able to update its information even though it is not connected to the Cloud 830.

Therefore, a vehicle can receive information from other nearby vehicles of important data that they want to share or make available, such as, for example, software updates, location data, map updated, look-ahead context, etc. Vehicles can also receive notifications from the Cloud 830 that other vehicles are available nearby, as well as details of those vehicles in terms of number of Wi-Fi radios available, speed, direction and location of the vehicle, etc. By allowing a vehicle to get updated in this manner even when it is not connected to a Cloud server, transportation safety and user experience may be greatly increased.

Figure 12:
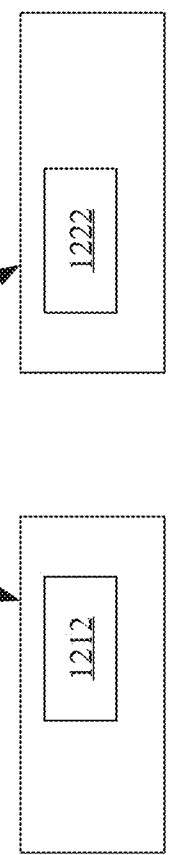
FIG. 12 shows an example communication among three vehicles, in accordance with various aspects of the present disclosure.

FIG. 12 shows an example communication among three vehicles, in accordance with various aspects of the present disclosure. Any or all of the functionality discussed herein may be performed by any or all of the example components of the example network of FIG. 12. Also, the example network in FIG. 12 may, for example, share any or all characteristics with the other example methods, systems, networks and/or network components of FIGS. 1-6, 8, 10-11, and 13-18, discussed herein.

Referring to FIG. 12, there is shown scenario 5 with an example of multiple V2V through different vehicles. In this scenario, a vehicle 1200 may connect via Wi-Fi to two different vehicles using two different Wi-Fi radios 1202 and 1204.

With this configuration, the vehicle 1200 is able to use its Wi-Fi radios 1202 and 1204 to communicate with vehicles 1210 and 1220 using Wi-Fi connection 1251 and 1252, respectively, which can be used for high-bandwidth applications performed between different vehicles, such as see-through scenarios. In a see-through scenario, the vehicle 1210 may not have direct communication with the vehicle 1220, but they may still be able to communicate with each other via the vehicle 1200.

The context information may be similar as in scenario 4 for the goal of supporting communications by high-bandwidth applications performed between different vehicles that are fully isolated from direct communication with each other.

Figure 13:
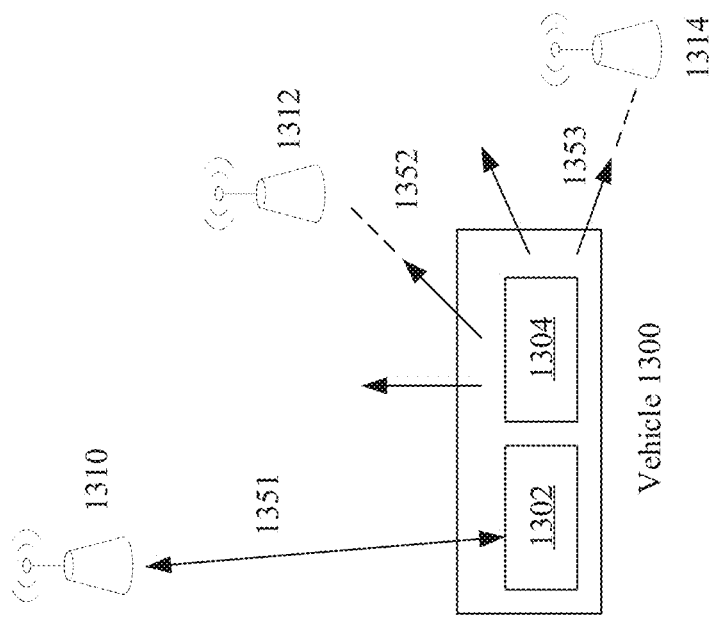
FIG. 13 shows an example communication between a vehicle and multiple fixed access points, in accordance with various aspects of the present disclosure.

FIG. 13 shows an example communication between a vehicle and multiple fixed access points, in accordance with various aspects of the present disclosure. Any or all of the functionality discussed herein may be performed by any or all of the example components of the example network of FIG. 13. Also, the example network in FIG. 13 may, for example, share any or all characteristics with the other example methods, systems, networks and/or network components of FIGS. 1-6, 8, 10-12, and 14-18, discussed herein.

Referring to FIG. 13, there is shown scenario 6 with an example of single V2I Wi-Fi communication using Wi-Fi connection 1351 and scanning over Wi-Fi for other Wi-Fi devices. In this scenario, the vehicle 1300 connects using a Wi-Fi radio 1302 to a single SSID broadcast by a fixed Wi-Fi AP 1310, while the second Wi-Fi radio 1304 is used for scanning networks/vehicles nearby.

This may be similar to scenario 1, but there are two active Wi-Fi radios 1302 and 1304, one used in connecting mode, other in scanning mode. This can be used to reduce the time to first byte (TTFB) where the next available Wi-Fi network(s) can be detected while the present communication is taking place, as well as reducing the throughput that is lost when a Wi-Fi mode is changed from connected to scanning and then to connected. Accordingly, this configuration allows for increased throughput and decreased Wi-Fi connecting time, where the context information needed may be the same as in scenarios 1 and 2.

FIG. 14 shows an example communication between two vehicles while one of the two vehicles is also scanning for other communication devices, in accordance with various aspects of the present disclosure. Any or all of the functionality discussed herein may be performed by any or all of the example components of the example network of FIG. 14. Also, the example network in FIG. 14 may, for example, share any or all characteristics with the other example methods, systems, networks and/or network components of FIGS. 1-6, 8, 10-13, and 15-18, discussed herein.

Referring to FIG. 14, there is shown scenario 7 with an example of single V2V Wi-Fi communication using Wi-Fi connection 1451 and scanning over Wi-Fi for other Wi-Fi device(s). In this scenario, the vehicle 1410 connects via Wi-Fi to another vehicle 1400 using the Wi-Fi radio 1412, while the second Wi-Fi radio 1414 is used for scanning networks/vehicles nearby.

This is similar to scenario 4, but there are two Wi-Fi radios in use. The Wi-Fi radio 1412 is used in connecting mode, the Wi-Fi radio 1414 is used in scanning mode. Accordingly, the TTFB may be reduced by detecting vehicles broadcasting Wi-Fi networks earlier in the process, as well as reducing the throughput lost when changing the Wi-Fi mode from connected to scanning and then to connected with the new node. Accordingly, with this configuration, throughput and Wi-Fi connection time may be increased. The context information needed may be the same as for scenario 4.

FIG. 15 shows an example communication between two vehicles, where there are multiple mobile access points in the first vehicle communicating with multiple mobile access points in the second vehicle, in accordance with various aspects of the present disclosure. Any or all of the functionality discussed herein may be performed by any or all of the example components of the example network of FIG. 15. Also, the example network in FIG. 15 may, for example, share any or all characteristics with the other example methods, systems, networks and/or network components of FIGS. 1-6, 8, 10-14, and 16-18, discussed herein.

Referring to FIG. 15, there is shown scenario 8 with an example of multiple V2V communication through the same vehicle. For example, vehicle 1500 communicates via its radios 1502 and 1504 with the vehicle 1510 via its radios 1512 and 1514, The vehicle 1500 is able to connect to different SSIDs broadcast by another vehicle 1510, either in different frequencies or channels. Accordingly, the vehicle 1500 is able to use more bandwidth for its communication with the vehicle 1510 since there is generally no interference due to use of the different frequencies or channels.

The context information needed may be the same as for scenario 4 to support high-bandwidth applications between different vehicles, such as, for example, see-through scenarios.

FIG. 16 shows an example communication between a first mobile access point in a vehicle and a fixed access point, and between a second mobile access point in the vehicle and multiple end users, in accordance with various aspects of the present disclosure. Any or all of the functionality discussed herein may be performed by any or all of the example components of the example network of FIG. 16. Also, the example network in FIG. 16 may, for example, share any or all characteristics with the other example methods, systems, networks and/or network components of FIGS. 1-6, 8, 10-15, and 17-18, discussed herein.

Referring to FIG. 16, there is shown scenario 9 with an example of single V2I Wi-Fi connection and in-vehicle Wi-Fi connection with different Wi-Fi devices.

For example, the vehicle 1600 may be connected to by the Wi-Fi radio 1604 to a single SSID broadcast by a fixed Wi-Fi AP, while the second Wi-Fi radio 1602 is broadcasting its associated SSID to provide in-vehicle Wi-Fi access to, for example, driver, passengers, or devices that may have Wi-Fi devices.

The context information may be similar as for scenario 1, as well as for the software of the vehicle 1600 to be aware of the applications and services that require Wi-Fi connectivity, and the amount of data to be transferred. In this manner, Internet over Wi-Fi may be provided to the passengers, drivers, and devices. In this scenario, the overall quality of experience (QoE) provided may be increased for a user and/or applications/services by measuring the QoE. The U.S. patent application Ser. No. 15/644,377 discloses methods and systems for measuring quality of experience, and is incorporated herein in its entirety.

Figure 17:
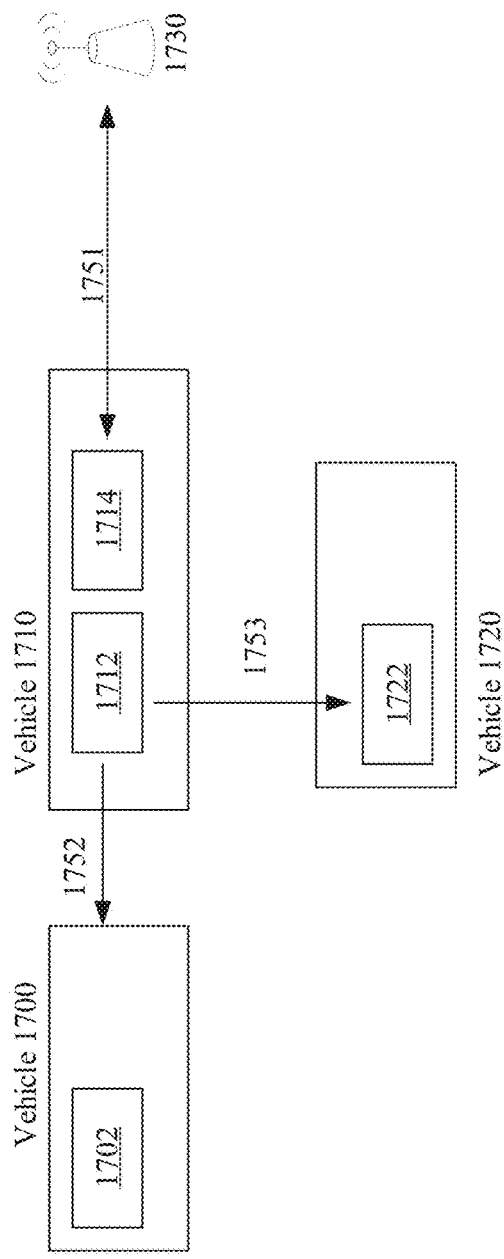
FIG. 17 shows an example communication between a first mobile access point in a vehicle and a fixed access point, and between a second mobile access point in the vehicle and multiple vehicles, in accordance with various aspects of the present disclosure.

FIG. 17 shows an example communication between a first mobile access point in a vehicle and a fixed access point, and between a second mobile access point in the vehicle and multiple vehicles, in accordance with various aspects of the present disclosure. Any or all of the functionality discussed herein may be performed by any or all of the example components of the example network of FIG. 17. Also, the example network in FIG. 17 may, for example, share any or all characteristics with the other example methods, systems, networks and/or network components of FIGS. 1-6, 8, 10-16, and 18, discussed herein.

Referring to FIG. 17, there is shown scenario 10 with an example of single V2I Wi-Fi connection by the vehicle 1710 and a multi-hop to other vehicles 1700 and 1720 via Wi-Fi.

The vehicle 1710 connects via a Wi-Fi radio 1714 to a single SSID broadcast by a fixed Wi-Fi AP 1730, while the second Wi-Fi radio 1712 is broadcasting a SSID to provide Wi-Fi access to the vehicles 1700 and 1720 that can connect to the first vehicle 1710 via Wi-Fi.

In this case, the vehicle 1710 has two Wi-Fi radios 1712 and 1714, and the Wi-Fi radio 1714 is used to connect to the Wi-Fi AP 1730 (as in scenario 1), and the other Wi-Fi radio 1712 is used to broadcast Wi-Fi to outside of the vehicle 1710, where, for example, other vehicles 1700 and 1720 may receive the broadcast signal, thereby building a chain of vehicles connected by Wi-Fi. This scenario illustrates increasing the range of coverage of Wi-Fi APs.

The context information may be the context information both from scenarios 1 and 4 to increase the range of coverage of Wi-Fi access points.

Figure 18:
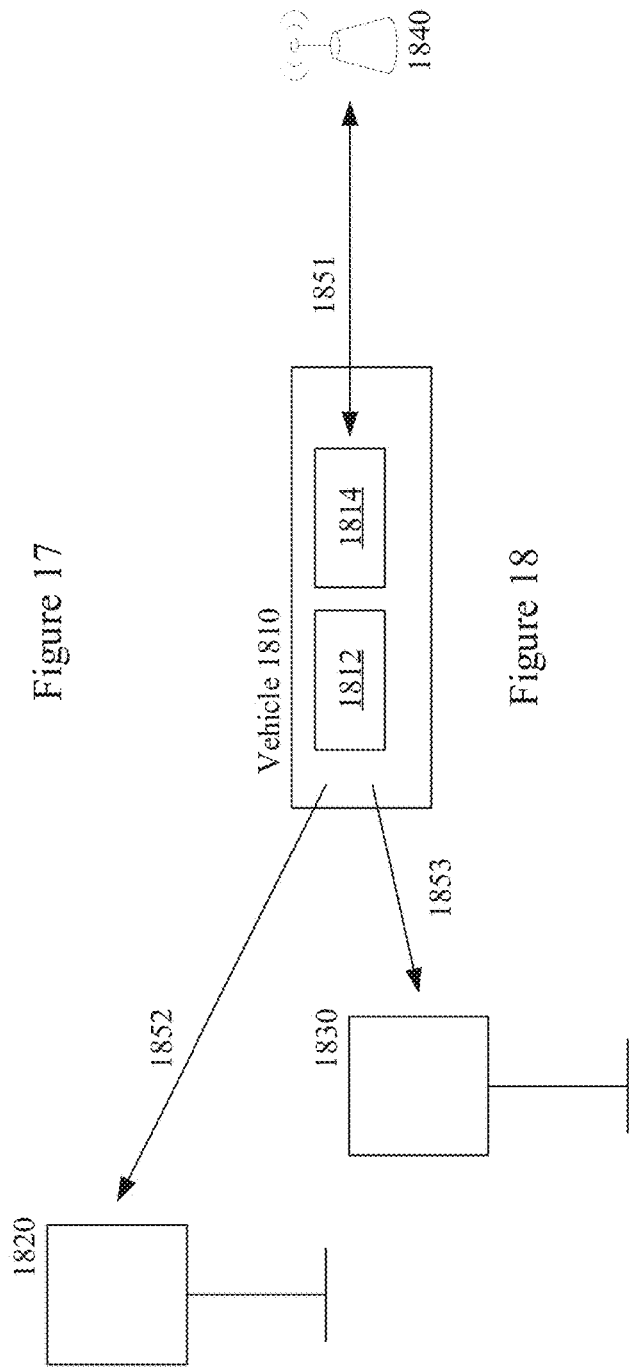
FIG. 18 shows an example communication between a first mobile access point in a first vehicle with a fixed access point, and between a second mobile access point in the first vehicle with multiple external devices, in accordance with various aspects of the present disclosure.

FIG. 18 shows an example communication between a first mobile access point in a first vehicle with a fixed access point, and between a second mobile access point in the first vehicle with multiple external devices, in accordance with various aspects of the present disclosure. Any or all of the functionality discussed herein may be performed by any or all of the example components of the example network of FIG. 18. Also, the example network in FIG. 18 may, for example, share any or all characteristics with the other example methods, systems, networks and/or network components of FIGS. 1-6, 8, and 10-17, discussed herein.

Referring to FIG. 18, there is shown scenario 11 with an example of single V2I Wi-Fi connection and external Wi-Fi connections. The vehicle 1810 connects via the Wi-Fi radio 1814 to a single SSID broadcast by a fixed Wi-Fi AP 1840, while the second Wi-Fi radio 1812 is broadcasting a SSID to provide Wi-Fi access to devices that can connect to the vehicle via Wi-Fi. The second Wi-Fi radio 1812 may connect to, for example, the Wi-Fi devices 1820 and 1830, which may be associated with, for example, sensors and networking units outside of the vehicle 1810. The vehicle 1810 may broadcast data to be uploaded to the Cloud 830 to the devices 1820 and 1830, where the devices 1820 and 1830 may perform the upload.

The context information may be, for example, similar to those provided in scenario 10 where it may be useful for the vehicle to be aware of nearby devices. Accordingly, data from the vehicle 1810 may be broadcast via Wi-Fi to outside of the vehicle 1810, and sensors and networking units such as the devices 1820 and 1830 outside of the vehicle 1810 may upload the data to the Cloud 830.

While various example scenarios have been described, it can be seen that there may still be other scenarios regarding communication involving various vehicles, devices, MAPs, and/or FAPs that support Wi-Fi communication. These other scenarios may use context information described in one or more of the scenarios, or they may need other context information.

In support of these scenarios, the Wi-Fi radios may be turned-on as required by the in-vehicle services and applications, or when receiving any context trigger (from inside the vehicle, neighborhood, APs, or Cloud) that requires the use of one or more Wi-Fi radios. When not required (e.g., no data to be sent/received from the Cloud) the Wi-Fi radio(s) may be turned off so as to not waste in-vehicle resources.

When turned-on, the configurations of each Wi-Fi radio may vary based on the scenario and Wi-Fi mode. The vehicle may decide the number of Wi-Fi radios that should be turned on and their configurations (e.g., V2I connecting, V2V connecting, V2I scanning, V2V scanning, AP mode, etc.) based on the different context sources available.

To avoid constant ping-pong effect between different Wi-Fi configurations, thresholds may be established in order to decide when to move from one configuration to another one that suddenly becomes the best one based on the current context. Accordingly, a specific Wi-Fi configuration may be made available when it will be used in a specific location, in a specific environment and/or context.

Based on the full context and the global overview of all the vehicle actions and context in the Cloud, the vehicles may receive notifications from the Cloud to take into consideration when performing new decisions.

When performing an action and/or decision, a vehicle may have information received from other vehicles, received from the Cloud, or from neighboring APs, as well as information generated on-board. The extent or particularity of each action and/or decision may require giving more importance the context received from the Cloud, for example, or to prioritize the context received from the vehicle neighborhood. Accordingly, a weight for each type of information may vary depending on a particular situation of the vehicle such as, for example, day of the week, time of the day, location of the vehicle, repairs to the infrastructure, whether special events are being held nearby, etc.

Figure 19:
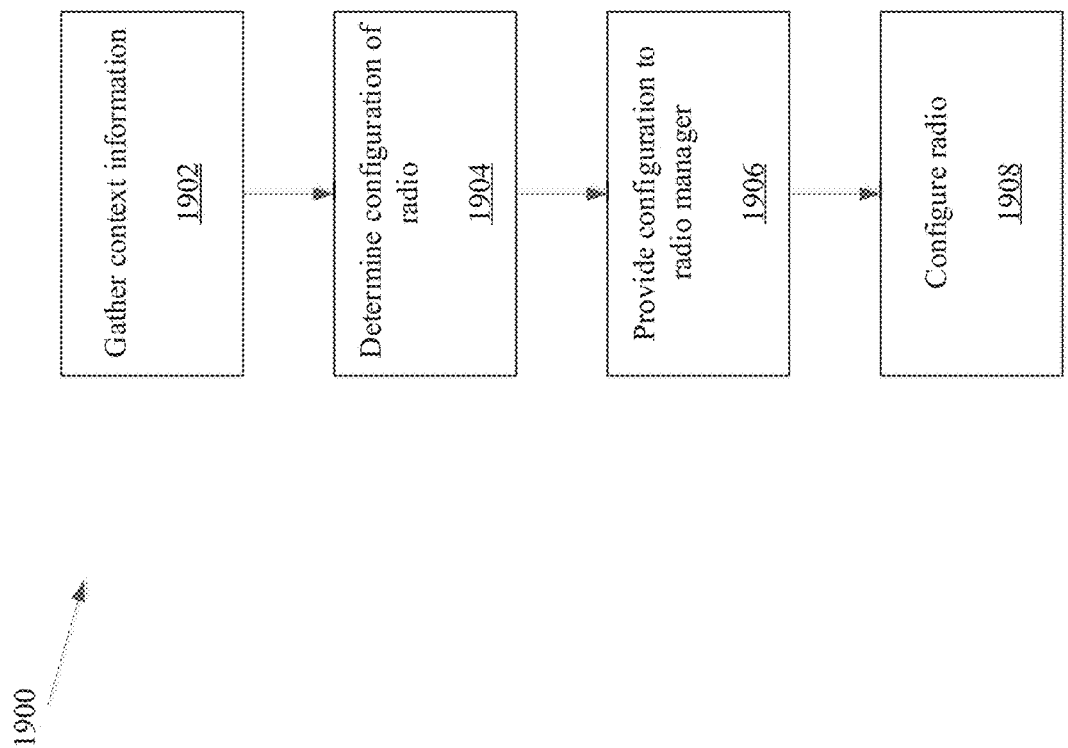
FIG. 19 shows an example flow diagram for configuring a radio for communication, in accordance with various aspects of the present disclosure.

FIG. 19 shows an example flow diagram for configuring a radio for communication, in accordance with various aspects of the present disclosure. Referring to FIG. 19, there is shown an example flow diagram 1900. At block 1902, the context broker 832 at, for example, the mobile vehicle 700 may gather context information for use in managing the plurality of radios 836a . . . 838a. The context broker 832 may comprise, for example, the processing module 900 that executes a context broker application resident in the memory 920 or in another memory. The context information may be gathered from, for example, the various radios 836a . . . 838a, as well as sensors 839 in or on the vehicle 700. The various sensors 839 may comprise one or more of the sensors described herein such as, for example, motion detection sensors, environmental sensors, cameras, microphones, gas sensors, biometric sensors, etc. The radios 836a . . . 838a may be in communication with other devices, scanning for devices to communicate with, and/or broadcasting their respective SSIDs so they can be found by other devices.

At block 1904, the Wi-Fi radio manager 834 may process the context information from the context broker 832 to determine how a specific one of a plurality of radios should be configured. For example, a radio 836a . . . 838a that is not in communication with any other device may be turned off to save resources such as power, memory (local and/or storage), processor utilization, etc. A radio 836a . . . 838a that is turned off may be turned on, for example, when a device is detected that is not connected to one of the Wi-Fi radios 836a . . . 838a.

A radio 836a . . . 838a may be configured, for example, to support vehicle-to-infrastructure (V2I) communication, vehicle-to-vehicle-to infrastructure (V2V2I) communication, vehicle-to-vehicle (V2V) communication, and/or access point (AP) functionality.

The Wi-Fi configuration may also depend on variables such as, for example, the hardware and radios available in a vehicle, the applications that require Wi-Fi access, and the environment context of the vehicle. The environment context may be, for example, the number of APs within communication distance of the vehicle, nearby vehicles and users, etc. Other variables may also include, for example, the amount of data to be transferred, the speed of the vehicle, the direction of the vehicle, the location of the vehicle, etc.

Policies from the customer may also influence the configuration. For example, the customer policy may indicate the amount of data that the customer is allocated for transfer, the amount the customer is willing to pay for transmission/reception of data, the importance of data transfer (real-time or delayed), etc.

Accordingly, various embodiments of the disclosure may optimize operation by adjusting a configuration to reduce the overall cost consumption per distance, time, and vehicle/fleet. A configuration may also increase the data offloaded as needed for faster and/or cheaper transfer, and may increase the overall quality experienced per application, service, or user.

Each Wi-Fi configuration may be configured locally at the vehicle or remotely in the Cloud, taking into account real-time and/or historical decision factors and parameters. Accordingly, the radio managers 836 . . . 838 may acquire and configure all the relevant information (e.g., signal power, RSSI, interference, channels, frequencies, etc.) for the radios 836*a* . . . 838*a* that they correspond to.

At block 1906, the Wi-Fi radio manager 834 may provide to one of the radio managers 836 . . . 838 a configuration for a corresponding radio. At block 1908, the appropriate one of the radio managers 836 . . . 838 may properly configure the appropriate radio 836*a* . . . 838*a* for communication with another electronic device.

While Wi-Fi communication has been described for ease of description, it should be understood that any type of communication may be used in place of, or in addition to W-Fi communication.

Therefore, it can be seen various embodiments of the disclosure provide for a system for communication that comprises a context broker configured to gather context information for use in managing a plurality of radios, a Wi-Fi radio manager configured to manage a plurality of radio managers using the context information from the context broker, and a plurality of radios, where each of the plurality of radio managers is configured to manage a respective one of the plurality of radios for communication with another electronic device using radio configuration information received from the Wi-Fi radio manager. At least a portion of the context information may be received from a Cloud server.

The context broker, the Wi-Fi radio manager, the plurality of radio managers, and the plurality of radios may be, for example, in a mobile vehicle. The context information may comprise, for example, one or more of: resources for one or more vehicles external to the mobile vehicle, location of the mobile vehicle, speed of the mobile vehicle, direction of travel of the mobile vehicle, and processing capabilities of the mobile vehicle. The Wi-Fi radio manager may be configured to determine whether to turn on or off a specific one of the plurality of radios The context information may also comprise, for example, infrastructure information regarding one or more infrastructures. The infrastructure information may comprise, for example, information regarding one or more of nearby access points (APs), present route for the mobile vehicle, and nearby vehicles.

At least one of the plurality of radios may be configured to connect an electronic device in the mobile vehicle to a network external to the mobile vehicle. The Wi-Fi radio manager may be configured to turn on a specific one of the plurality of radios due to needs of services and applications of the mobile vehicle. The Wi-Fi radio manager may be configured to turn on a specific one of the plurality of radios that was turned off due to a context trigger that requires the use of one or more Wi-Fi radios, where the context trigger may be due to context information from inside the mobile vehicle, a neighborhood around the mobile vehicle, one or more access points (APs), or a Cloud server.

When the specific one of the plurality of radios is turned on, the specific radio may be configured for, based on context information for the specific radio, a vehicle to infrastructure (V2I) connecting mode, a vehicle to vehicle (V2V) connecting mode, a V2I scanning mode, a V2V scanning mode, or an access point mode. The Wi-Fi radio manager may be configured to use at least one threshold to determine when to change a configuration of the specific radio. A respective weight may be applied to the context information from each of: the mobile vehicle, the neighborhood around the mobile vehicle, the one or more APs, and the Cloud server.

Various embodiments of the disclosure may also provide for a method for communication that may comprise gathering, by a context broker context, information for use in managing a plurality of radios, determining, by a Wi-Fi radio manager, how a specific one of a plurality of radios should be configured using the context information from the context broker, providing to a radio manager, by the Wi-Fi radio manager, a configuration for the specific radio based on the context information from the context broker, and configuring by the radio manager, the specific radio for communication with another electronic device using radio configuration information received from the Wi-Fi radio manager.

The configuration may take into account one or more of signal power, receive signal strength indication (RSSI), interference, channels, and frequencies. The context broker, the Wi-Fi radio manager, the plurality of radio managers, and the plurality of radios are in a mobile vehicle. The context information may comprise one or more of a location of the mobile vehicle, a speed of the mobile vehicle, a direction of travel of the mobile vehicle, processing capabilities of the mobile vehicle, and resources for at least one vehicle external to the mobile vehicle. The context information may comprise infrastructure information regarding one or more infrastructures.

The Wi-Fi radio manager may be configured to determine whether to turn on a specific one of the plurality of radios, which was turned off, due to a context trigger that requires use of one or more Wi-Fi radios, where the context trigger may be due to the context information from inside the mobile vehicle, a neighborhood around the mobile vehicle, one or more APs, or a Cloud server. A respective weight may be applied to the context information from each of: the mobile vehicle, the neighborhood around the mobile vehicle, the one or more APs, and the Cloud server In accordance with various aspects of this disclosure, examples of the networks, components, and methods and systems of calculating QoE thereof presented herein are provided in U.S. patent application Ser. No. 15/644,377, titled "Systems and Methods for Calculating the User QoE Based on WiFi Sessions Over Multiple Networks in a Network of Moving Things," filed on Jul. 7, 2017, which claims priority to, and claims benefit from U.S. Provisional Application Ser. No. 62/417,734, filed on Nov. 4, 2016, and titled "Systems and Methods for Calculating the User QoE Based on WiFi Sessions Over Multiple Networks in a Network of Moving Things," which are hereby incorporated herein by reference in their entirety.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What are claimed:

1. A system for communication, comprising:
   a plurality of radios,
   a context broker configured to gather context information for use in managing the plurality of radios, wherein the context information comprises mobility-related information for a mobile vehicle associated with the context broker, and communication-related information relating to needs and/or requirements of one or more applications and/or services;
   a Wi-Fi radio manager configured to manage a plurality of radio managers using the context information from the context broker; and
   wherein each of the plurality of radio managers is configured to manage a respective one of the plurality of radios for communication with another electronic device using radio configuration information received from the Wi-Fi radio manager; and
   wherein the Wi-Fi radio manager is configured to, when managing the plurality of radio managers:
      select based on one or both of the mobility-related information and the communication-related information one or more radios of the plurality of radios;
      map data and/or traffic flows associated with the applications and/or services to the one or more radios; and
      generate or adjust radio configuration information for each of the one or more radios to facilitate communication of the mapped data and/or traffic flows via the one or more radios.

2. The system of claim 1, wherein the context broker, the Wi-Fi radio manager, the plurality of radio managers, and the plurality of radios are in the mobile vehicle.

3. The system of claim 1, wherein the context information further comprises information relating to one or both of processing capabilities of the mobile vehicle and resources for at least one vehicle external to the mobile vehicle.

4. The system of claim 1, wherein the context information further comprises infrastructure information regarding one or more infrastructures.

5. The system of claim 4, wherein the infrastructure information comprises information regarding one or more of nearby access points (APs), present route for the mobile vehicle, and nearby vehicles.

6. The system of claim 1, wherein at least one of the plurality of radios is configured to connect an electronic device in the mobile vehicle to a network external to the mobile vehicle.

7. The system of claim 1, wherein the Wi-Fi radio manager is configured to turn on a specific one of the plurality of radios due to needs of services and applications of the mobile vehicle.

8. The system of claim 1, wherein the Wi-Fi radio manager is configured to determine whether to turn on a specific one of the plurality of radios, which was turned off, due to a context trigger that requires use of one or more Wi-Fi radios, wherein the context trigger is due to context information from inside the mobile vehicle, a neighborhood around the mobile vehicle, one or more APs, or a Cloud server.

9. The system of claim 8, wherein, when the specific one of the plurality of radios is turned on, the specific radio is configured for, based on context information for the specific radio, a vehicle to infrastructure (V2I) connecting mode, a vehicle to vehicle (V2V) connecting mode, a V2I scanning mode, a V2V scanning mode, or an access point (AP) mode.

10. The system of claim 9, wherein the Wi-Fi radio manager is configured to use at least one threshold to determine when to change a configuration of the specific radio.

11. The system of claim 8, wherein a respective weight is applied to the context information from each of: the mobile vehicle, the neighborhood around the mobile vehicle, the one or more APs, and the Cloud server.

12. The system of claim 1, wherein at least a portion of the context information is received from a Cloud server.

13. The system of claim 1, wherein the Wi-Fi radio manager is configured to turn on or turn off a specific one of the plurality of radios.

14. A method for communication, comprising:
gathering, by a context broker, context information for use in managing a plurality of radios, wherein the context information comprises mobility-related information for a mobile vehicle associated with the context broker, and communication-related information relating to needs and/or requirements of one or more applications and/or services;
selecting, by a Wi-Fi radio manager based on one or both of the mobility-related information and the communication-related information, one or more radios of the plurality of radios;
mapping, by the Wi-Fi radio manager, data and/or traffic flows associated with the applications and/or services to the one or more radios;
generating or adjusting, by the Wi-Fi radio manager, radio configuration information for each of the one or more radios to facilitate communication of the mapped data and/or traffic flows via the one or more radios; and
for each of one or more radio managers, of a plurality of radio managers, associated with the one or more radios:
providing to a radio manager, by the Wi-Fi radio manager, radio configuration information for a specific radio; and
configuring, by the radio manager, the specific radio for communication with another electronic device using radio configuration information received from the Wi-Fi radio manager.

15. The method of claim 14, wherein the configuration takes into account one or more of signal power, receive signal strength indication (RSSI), interference, channels, and frequencies.

16. The method of claim 14, wherein the context broker, the Wi-Fi radio manager, the plurality of radio managers, and the plurality of radios are in the mobile vehicle.

17. The method of claim 14, wherein the context information further comprises information relating to both of processing capabilities of the mobile vehicle and resources for at least one vehicle external to the mobile vehicle.

18. The method of claim 14, wherein the context information further comprises infrastructure information regarding one or more infrastructures.

19. The method of claim 14, wherein the Wi-Fi radio manager is configured to determine whether to turn on a specific one of the plurality of radios, which was turned off, due to a context trigger that requires use of one or more Wi-Fi radios, wherein the context trigger is due to the context information from inside the mobile vehicle, a neighborhood around the mobile vehicle, one or more APs, or a Cloud server.

20. The method of claim 14, wherein a respective weight is applied to the context information from each of: the mobile vehicle, the neighborhood around the mobile vehicle, the one or more APs, and the Cloud server.

* * * * *